United States Patent [19]

Corcoran

[11] 3,739,154

[45] June 12, 1973

[54] OPTICAL TRACKING APPARATUS FOR READ-OUT OF HIGH-DENSITY RECORDING

[75] Inventor: John W. Corcoran, Los Altos, Calif.

[73] Assignee: Ampex Corporation, Redwood City, Calif.

[22] Filed: May 1, 1972

[21] Appl. No.: 249,202

[52] U.S. Cl. 235/61.11 E, 340/146.3 H, 340/174.1 B

[51] Int. Cl. ........................................ G06r 7/015

[58] Field of Search.......... 340/146.3 H, 146.3 AH, 340/174.1 B, 173.1 LM; 179/100.2 MI; 235/61.11 E

[56] References Cited

UNITED STATES PATENTS

| | | | |
|---|---|---|---|
| 3,154,762 | 10/1964 | Morphet, Jr. | 340/146.3 H |
| 3,165,717 | 1/1965 | Eckelman et al. | 340/146.3 H |
| 3,274,550 | 9/1966 | Klein | 340/146.3 H |
| 3,295,104 | 12/1966 | Relis | 340/146.3 H |
| 3,432,673 | 3/1969 | Mader | 340/146.3 H |
| 3,496,540 | 2/1970 | Kripl | 340/146.3 H |
| 3,531,770 | 9/1970 | Mauch et al. | 340/146.3 AH |

*Primary Examiner*—Thomas A. Robinson
*Attorney*—Robert G. Clay

[57] ABSTRACT

In read-out apparatus which employs an optical scanner with a stationary output beam, a magnified image of an elongated scanning spot may be formed on an array of detectors. As the elongated spot scans the tracks, the track images scan the detector array. Equivalently, the demagnified image of the array may be thought of as moving along the tracks in the scan plane. Skew or flutter causes the track (of plurality of tracks) to move along the detector array, whereby detecting the sequence of change in the orientation between the track and the detectors determines the relative direction of motion of the track. An electronic logic circuit is coupled to the detectors, and generates tracking error signals of magnitudes and polarities which are indicative of the tracking error caused by flutter. The tracking error signals are delivered to the tape transport to provide track position correction. Skew error is compensated via linear gate devices, which switch the detectors to continuously pass the signal of the one track being read to the output, regardless of which detector or pairs of detectors, is temporarily aligned with that track.

8 Claims, 7 Drawing Figures

OPTICAL TRACKING APPARATUS FOR READ-OUT OF HIGH-DENSITY RECORDING

The invention herein described was made in the course of a contract with the Department of the Army.

BACKGROUND OF THE INVENTION

1. Field of the Invention

The invention relates to read-out tracking of high-density recordings, and particularly to a simplified optical tracking method and apparatus for magnetooptical, laser, etc., read-out systems.

2. Description of the Prior Art

Preferred prior art read-out tracking systems presently utilize the concept of spot wobbling to determine the lateral position of a read scan spot with respect to the track center line. The scan spot is oscillated (wobbled) at a relatively high frequency in a direction perpendicular to the scan direction along the track. Variations in output signal level generated by the scan spot, at the selected high frequency, are synchronously detected to determine a tracking error signal. The error signal is then applied (with the wobble frequency) to an electrooptical deflector, which controls the lateral position of the scan spot as it scans along the track. This deflector is expensive and has relatively limited control range of, for example, ±2 spot diameters.

In addition, the wobble concept implicitly reduces the signal-to-noise ratio, since the scan spot must be moved partially off the track in order to provide the detectable error signal, which causes a reduction in the signal being generated relative to the existing noise signals.

SUMMARY OF THE INVENTION

In optical scan apparatus having a stationary output beam, optical components thereof are disposed in the output beam to form a magnified image of an elongated scan spot on an elongated array of even and odd numbered detectors. As the elongated spot scans along a plurality of recorded tracks on the tape, the track images scan the detector array. The apparent magnified track spacing at the detector array is preferably an integral number, of the order of two or three, of the detector widths. The output from the array of detectors is fed to a logic circuit which generates tracking error signals which are indicative of the lateral motion of the recorded tracks relative to the detector array length. The resulting tracking error signal is delivered to transport apparatus and particularly to a capstan servo, which corrects the longitudinal position of the tape as determined by the tracking error signal.

The logic circuit includes linear gate devices, wherein the latter are selectively switched to continuously pass the signal of the one track being read out to the output data line regardless of which detector, or pairs of (odd and even) detectors, with which the track is momentarily in register. Tracking errors due to skew are compensated by the logic and the switching circuits which provide read-out of the same track regardless of the skew.

The logic circuit provides electronics which detect whether the track is centered between odd and even, or between even and odd, detectors, or is centered on an odd, or centered on an even, detector. In addition, the logic provides means for determining the direction of the movement of the track relative to the detectors; i.e., whether a track has moved toward, or away from, a higher numbered detector. The resulting magnitude and polarity of the resulting tracking error output from the logic circuit provides signals which are utilized to correct for tracking errors.

Thus, the invention contemplates the simultaneous observation and scan of a plurality of recorded tracks in a recording medium during read-out, unlike prior art optical read-out apparatus which scan a single track with a relatively small scan spot. The output signals are then processed via the logic and switching circuits to determine which detector or detectors of the array is generating the signal associated with the single track which is to be read. Thereupon the correct detector or detectors are coupled to the output line to provide the data output corresponding to the information recorded on the single track, while providing tracking error signals for controlling the tape transport at the start of the scan.

DESCRIPTION OF THE PREFERRED EMBODIMENTS

Figure 1:
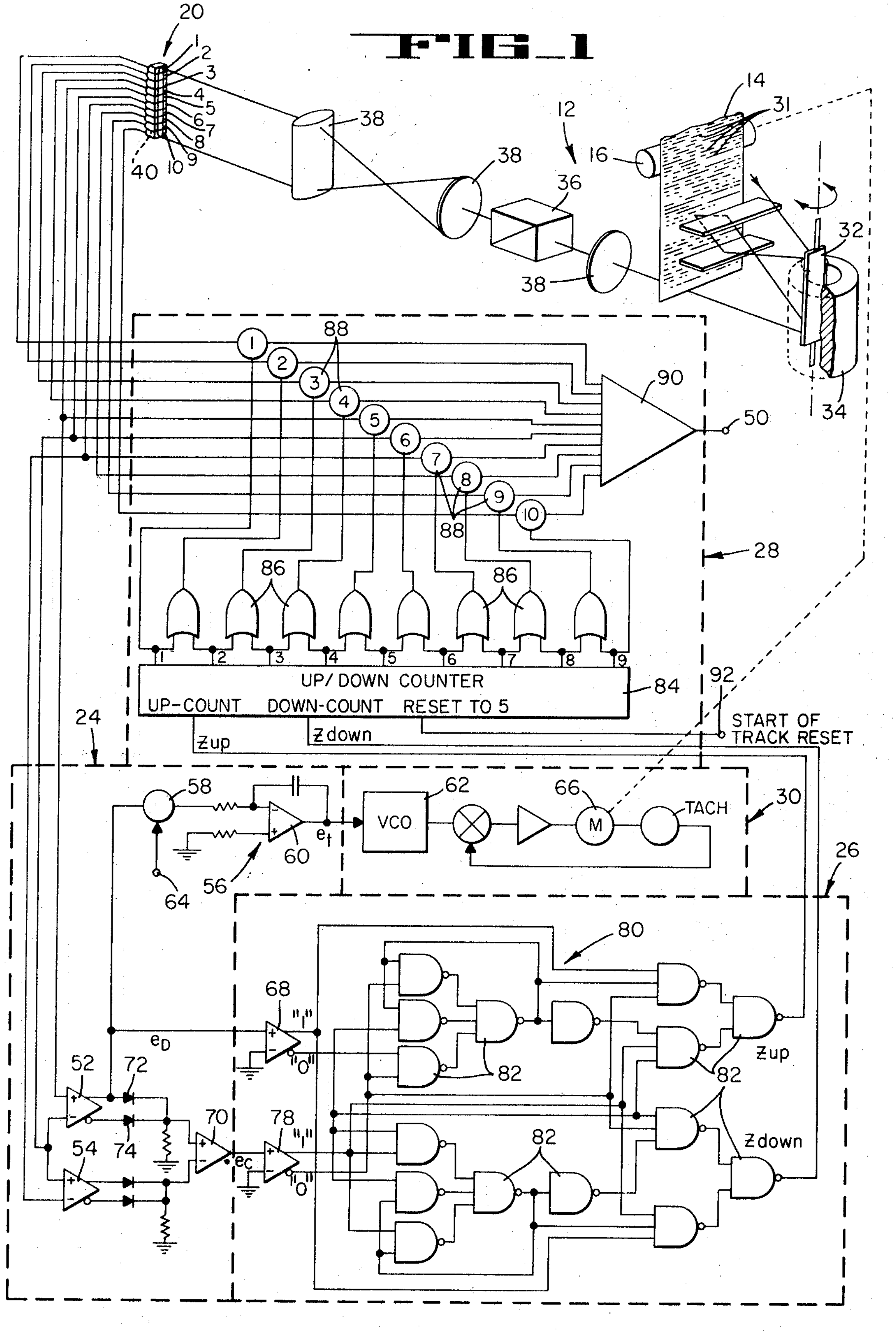
FIG. 1 is a schematic diagram depicting optical scanning apparatus for generating the selected elongated scan spot, and electronics for detecting and correcting flutter and skew errors in accordance with the invention.

Referring to FIG. 1, an optical scanning system 12 is employed to scan a recorded medium 14 during the read-out process thereof. The medium is moved past the transversely scanning beam via conventional capstan means 16. The optical scanning system 12 exemplifies one scanner system which includes the feature of a stationary output beam. Such a scanner system is further described in co-pending application Ser. No. 172,483, filed Aug. 17, 1971, and assigned to the same assignee as this application. It is to be understood that other optical scanning systems which generate a stationary output beam may be utilized in place of that described herein. In addition, the scan format may be a unidirectional (sawtooth) or zig-zag type of scan.

The output beam impinges an array 20 of detectors (numbered 1–10), which in turn introduce the electrical data signals generated therein to an electronic circuit generally termed herein as a logic circuit means. The logic circuit means generally includes an analog subtractor circuit 24, up/down detector circuit 26 and gating decoder circuit 28. A transport servo circuit 30 is coupled to an output of the analog subtractor circuit 24, and is mechanically coupled to the capstan means 16 to provide controlled longitudinal movement of the recorded medium 14 in accordance with the invention.

Recorded tracks 31 of the recording medium 14 are scanned via a pivotable mirror 32 of an electromechanical light scanner 34 in a manner fully described in the above-identified application. In this example, the deflector 34 generates a unidirectional scan across the medium, i.e., starts from the same edge of the medium with each scan. However, a zig-zag scan format may be employed, with a corresponding change in the invention circuit to sense the direction of scan, as further described below. The deflector further provides an output beam which is stationary, i.e., does not scan back and forth. The stationary output beam is fed to an analyzer 36 and associated optical lenses 38 to provide a suitable magnified elongated scanning spot 40 which covers the detectors 1–10 of the array 20. The spot 40 provides track images which scan the detector array 20 as it scans the tracks 31 on the recording medium 14. Equivalently, it may be said that the demagnified image of the array 20 moves along the tracks 31 in the scan plane of the recording medium 14.

Figure 2:
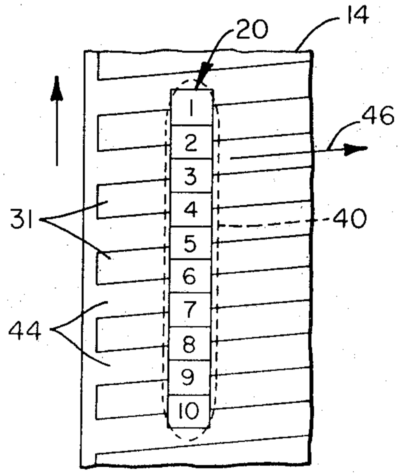
FIG. 2 is a plan of a portion of a recorded tape having transversely recorded tracks and depicting the relative demagnified images of the array of detectors.

FIG. 2 shows a portion of the recording medium 14 with recorded tracks 31 and track spacings indicated by 44. The detector array 20 is shown imaged on the tracks in the scan plane of the medium 14. In scanning the tracks, the detector array 20 moves in the direction of arrow 46 along the tracks 31. Thus, a magnified image of the elongated spot 40 is formed on the array of detectors 20 as shown in FIG. 2. The magnification is selected to match the detector size to the track width. The apparent magnified track spacing at the detector array 20 is preferably an integral number, such as 2 or 3, of the detector widths. For illustrative purposes, there is exemplified here apparatus which utilizes two detectors per track spacing, and a track width of one-half the track spacing.

It may be seen that four track detector orientations are possible; (a) wherein tracks are centered on odd numbered detectors; (b) wherein tracks are centered between odd and even detectors; (c) wherein tracks are centered on even numbered detectors; and (d) wherein tracks are centered between even and odd numbered detectors. The tracks 31 may move laterally along the detectors 1–10 among these orientations, or from the last to the first orientation due to transport flutter and/or skew effects. By detecting the sequence of the change of the orientation, for example, detecting the sequence abcda or adcba, the direction of track motion relative to the detector array caused by flutter or skew may be determined. This is the error information required to supply error correction signals to the transport to correct for flutter, and/or to provide logic signals via the logic circuit means which compensate for skew.

More particularly, the detectors 1–10 of the detector array 20 are respectively connected to the logic circuit means and particularly to the gating decoder 28. The detectors numbered 5, 6 and 7 located substantially in the center of the array 20, are also coupled to the input of the analog subtractor circuit 24. The analog subtractor circuit 24 provides three outputs; voltages $e_C$ and $e_D$ which provide information indicative of track lateral movement relative to the detector array 20 length, and a transport servo voltage $e_T$ which is fed to the transport servo circuit 30 to correct for gross flutter errors in order to start each scan on the proper track. Digital signals $Z_{up}$ and $Z_{down}$ are generated via the up/down detector circuit 26 and are fed to the input of the gating decoder 28, to provide switching which continuously passes the signal of the single track being read to a data output terminal 50. This latter switching feature provides a significant tolerance to track skew, i.e., any skew effects are compensated for via the logic circuit means which gates open the detector or detectors 1–10 which are in register with the track being read.

It is to be understood that the logic circuits described hereinafter in greater detail exemplify logic for implementing the logic circuit means of previous mention. Various logic hardware and circuit combinations may be developed to perform the functions performed by the logic circuit means illustrated here by way of example, and accordingly, the invention combination is not limited to the particular logic structures shown within the various circuits 24–28.

The array of detectors 1–10 utilized here by way of example, are demagnified to scan five tracks 31 simultaneously (FIG. 2). The minimum number of detectors required for a particular system is generally equal to twice the width (W) of the tape multiplied by the expected angle of skew ($\theta$), divided by the track spacing (S). It follows that 10 data outputs are provided from the 10 detectors 20, which outputs are introduced to the gating decoder 28. In addition, the data outputs from the three center detectors numbered 5, 6 and 7, are fed to a pair of analog amplifiers 52, 54 in the analog subtractor circuit 24. The signal from detector 5 is fed to the analog amplifier 52, and the output therefrom is delivered as voltage $e_D$ to a start-of-track circuit 56 comprised generally of an analog gate 58 and analog amplifier 60. Thus, the difference signal from analog amplifier 52 is fed to gate 58 which is gated open, for example, for the first 10 percent of the track scan duration. The 10 percent start of track scan is a selected arbitrary number; the period of time that gate 58 is open should be a small portion of the track scan duration such that the logic circuit means may determine that the detectors 5 and 6 start each scan on the correct track center. The gate 58 is opened via a pulse of selected duration introduced thereto via input 64, which pulse comprises a clock taken from the track scan apparatus, i.e., from a means which senses the start of scan of the mirror 32.

The signal from the analog amplifier 60 is fed as voltage $e_T$ to a capstan voltage controlled oscillator (VCO) 62, and thence to a transport servo circuit which includes capstan motor 66. The (VCO) 62 provides motor control to match the playback speed of the medium 14 during readout, to the track spacing on the medium as recorded during the recording process. Thus, in this example, the track being read is initially located at the beginning of the scan process at the center of detectors 5 and 6 in the detector array 20. Starting each scan at the middle of the detector array 20 allows the optimum amount of skew compensation in either direction.

An output from analog amplifier 52 is delivered as voltage $e_D$ to an (analog-to-digital) comparator 68 of the up/down detector circuit 26. Outputs from analog amplifiers 52, 54 are introduced to an analog amplifier 70 via diodes 72, 74, resulting in an output voltage $e_C$. If the difference signal between detectors 5, 6 is positive, diode 72 will conduct, and the input to analog amplifier 70 from analog amplifier 52 will be the positive signal. If the magnitude from analog amplifier 52 is negative, the inverted output will be positive, and diode 74 will conduct to provide the opposite signal polarity. The analog amplifier 54 functions in the same manner to provide a second positive signal to amplifier 70. Thus, the analog amplifiers 52, 54 always provide positive signals whose magnitudes are representative of which detector of pairs of detectors is providing the greatest output.

Figures 3A, 3B, 3C, 3D, 3E:
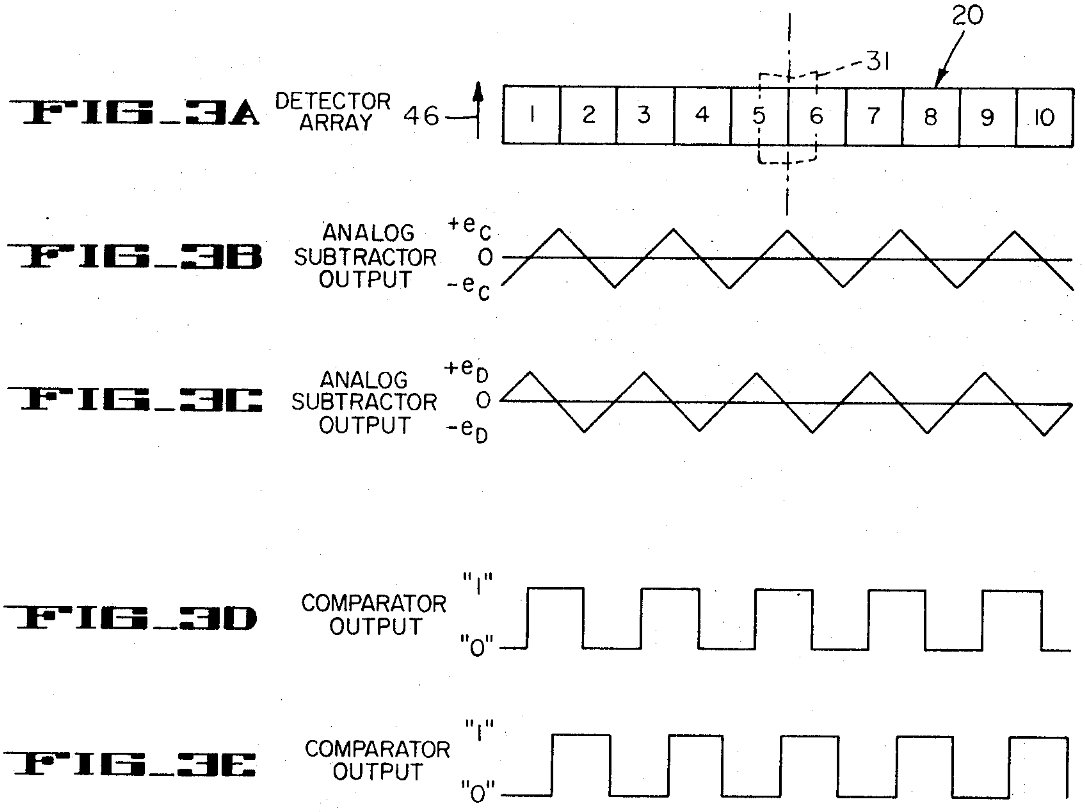
FIG. 3A–3E are graphs illustrating the tracking error signals generated by the logic circuit of FIG. 1.

To further illustrate the track movement sensing concept, FIG. 3A shows the positioning of the detectors 1–10 relative to a centrally located track 31. FIGS. 3B and 3C represent the output voltages $e_C$ and $e_D$, wherein the magnitude and polarity of the signals $e_C$ and $e_D$ are functions of where the track 31 is located relative to the series of detectors 1–10, as determined by the logic circuit means, viz, the analog subtractor circuit 24. In this exemplary circuit, the selected track spacing is equivalent to the width of two detectors. Thus, if a track is centered exactly upon one detector, the next detector will not have any signal, and the adjacent track will be centered on the next detector, etc. It follows that, in the course of the scan duration (after initially starting the scan of the track with detectors 5 and 6), if detector 1 or 3, 9, 10, etc., is in register with the track being read, there are other tracks which are variously in register with detectors 5, 6 and 7. Thus, detectors 5, 6 and 7 are always utilized in this example of the invention, to determine which direction the tracks are moving relative to the detector array 20 whereby skew can be compensated for via the various circuits 24–28, as further described below.

Thus, the analog subtractor circuit 24 initiates the determination of track movement during a scan. Referring to FIGS. 3B–3C, the voltage $e_C$ has a maxima when the tracks 31 are centered between odd and even numbered detectors, and a minima for a track location of even and odd numbered detectors. Voltage $e_D$ has a maxima when the tracks 31 are centered on odd numbered detectors, and a minima value when the tracks are centered on even numbered detectors.

In addition, a negative to positive transition of the voltage $e_D$ (FIG. 3C) when voltage $e_C$ (FIG. 3B) is negative, or a positive to negative transition of voltage $e_D$ when voltage $e_C$ is positive, indicates that the tracks 31 moved toward higher numbered detectors.

Inverse transition combinations show track 31 motion towards lower numbered detectors. From such signals the transport positional error due to skew can be deduced.

The voltages $e_D$ and $e_C$ are introduced to comparators 68, 78, which are termed analog-to-digital comparator circuits since they convert an analog input to a digital output while comparing two input voltages. Thus, if the input to either comparator 68, 78 is positive, the comparator delivers a "1" output, whereas if the input is negative the comparator delivers a "0" output. Thus, the analog-to-digital comparators deliver square wave outputs from triangular inputs. Note that the outputs of the comparators 68, 78 are determined by the polarity of the input signal, rather than the magnitude thereof.

The up/down detector circuit 26 shown here is by way of exemplifying one implementation of logic, which essentially determines when a transition occurs in the waveform of the voltage $e_C$, with reference to the waveform of the voltage $e_D$ (see FIGS. 3D and 3E). That is, the circuit 26 determines whether the comparators are generating a "1" or a "0." The circuit also looks at the last transition which occurred, and the condition of the last transition. In so doing, a sequential logic circuit 80 formed of a plurality of NAND gates 82, in conjunction with the inputs thereto, determines the direction of track movement relative to the detector array 20, and provides an output $Z_{up}$ when the track 31 moves towards a higher numbered detector, or an output $Z_{down}$ when the track moves towards the lower numbered detectors.

When the track 31 moves the distance of a detector width, the logic circuit means switches a new detector pair into the circuit such that the same track is continuously being scanned and its output delivered to the data output terminal 50, as further described below. Note, by way of example only, the present circuit utilizes detector pairs rather than a single detector, at any time during track movement detection, such that any contact of the track being read with an adjacent detector causes the logic circuit means to switch the circuitry to the next detector pair.

To this end, the gating decoder circuit 28 includes an up/down counter 84 which, in turn, is coupled to a series of OR gates 86. The OR gates are coupled to a plurality of (analog) linear gates 88 which are disposed to receive the outputs from the detectors 1–10 in the detector array 20. The outputs from the gates 88 are coupled via a summing amplifier 90 to the data output terminal 50.

In operation, the up/down counter 84 receives a very fast, reset pulse via a start-of-track reset terminal 92, which pulse provides a locking "1" to reset the counter 84 to 5. The reset pulse is a clock taken from the track scan apparatus which also provides the start-of-track clock to the gate 58 of previous mention. The reset pulse insures that the detector pair 5 and 6 are scanning the track to be read at initiation of the track scan. That is, the counter is set to 5 to open the fifth and sixth linear gate 88 with the start of each scan to initiate tracking in the center of the detector array 20. Thereafter, in the event the medium experiences a skew effect, the logic circuit means formed of components 24, 26 provides a suitable up or down count via counter 84, whereby the linear gates 88 are continuously switched (in pairs) via the OR gates 86. That is, each time the counter 84 receives an up count pulse ($Z_{up}$) the counter is stepped up to a higher output; each time a "1" is fed to the counter 84 on a down count ($Z_{down}$) the counter 84 steps one down. Thus, the track being read is continuously being coupled to the data output terminal 50 via action of the gates 88.

Although the gating decoder circuit 28 of the present circuit utilizes detector pairs to sense the track being read, whereby pairs of outputs are fed via pairs of linear gates 88 to the output data terminal 50, such configuration is by way of example only. For example, a single detector could be utilized instead. However, the use of a pair of detectors enhances the signal-to-noise ratio.

Although the invention combination has been described in conjunction with a unidirectional, saw tooth, optical scan format, it is equally adaptable for use with a zig-zag scan format. However, in the latter scan configuration it is in addition possible to scan in the wrong direction. Accordingly, in such zig-zag scan formats, a code may be placed on the start of each track or on alternate parity tracks, etc. A code detector circuit (not shown) is inserted between the summing amplifier 90 and the data output terminal 50 to sense the code, and feed back information to the logic circuit means, to determine whether tracking is proceeding in the right direction. Accordingly, there are various alternative recording formats wherein the invention combination provides improved tracking characteristics, while more efficiently utilizing the optical scanning apparatus.

I claim:

1. A tracking system for optical readout apparatus adapted to read successive tracks in a recorded medium, and for providing data output signals representing the information recorded on the tracks, said optical readout apparatus having a stationary output beam, comprising the combination of:

optical means including an elongated scan spot for scanning a plurality of tracks simultaneously;

means operatively coupled to the tracks for generating data signals indicative of the information on the plurality of tracks in response to the simultaneous impingement of the tracks by the elongated scan spot;

logic circuit means coupled to the means for generating for receiving the data signals and for providing a transport servo signal for controlling the position of a single selected track of the plurality relative to the means for generating;

said logic circuit means further providing digital signals which continuously select the data signals from he single selected track to define the data output signals.

2. The tracking system of claim 1 wherein the means for generating data signals includes an array of detectors optically disposed across the tracks to cause the track images to scan along the array of detectors as the elongated spot scans the plurality of tracks.

3. The tracking system of claim 2 wherein said logic circuit means is coupled to the array of detectors to generate the transport servo signal in response to the detector outputs, which servo signal is indicative of the position of the single selected track relative to the length of the detector array.

4. The tracking system of claim 3 wherein said logic circuit means further includes gating means operatively responsive to the digital signals to continuously provide passage of data signals indicative of the track being scanned to define the data output signals.

5. The tracking system of claim 4 wherein said logic circuit means includes an analog subtractor circuit coupled to a selected pair of the detectors and adapted to provide a signal equal to the difference between the data signals from the pair of detectors to define the transport servo signal, said analog subtractor circuit being coupled to a third selected detector and adapted to provide said digital signals indicative of the direction of movement of the plurality of tracks relative to the array of detectors.

6. The tracking system of claim 5 further including a plurality of analog gates coupled to the series of detectors in the detector array, said analog gates being responsive to said digital signals to continuously select the data signals from the single selected track to define therefrom the data output signals.

7. The tracking system of claim 6 wherein said analog subtractor circuit further includes a pair of analog amplifiers wherein a first and third of the detectors of said selected detectors are coupled to respective analog amplifiers, and the second detector is coupled to both the analog amplifiers, diode means coupled to the output lines of each analog amplifier, and a third analog amplifier coupled to the pairs of diodes and providing an analog output in quadrature with the output delivered to the transport servo circuit; and said logic circuit including first and second analog-to-digital comparator circuits disposed to receive the analog signals from the first and second analog amplifiers to provide a "1" output in response to a positive input, and a "0" output in response to a negative input, said "1" and "0" signals defining said digital signals for selectively actuating said analog gates.

8. The tracking system of claim 7 further including up/down counter means disposed to receive the digital signals, and adapted to count up in response thereto when the track movement is in a direction towards higher numbered detectors, and to count down when the track movement is in the direction of lowered numbered detectors of said detector array.

* * * * *

UNITED STATES PATENT OFFICE
CERTIFICATE OF CORRECTION

Patent No. 3,739,154 Dated June 12, 1973

Inventor(s) John W. Corcoran

It is certified that error appears in the above-identified patent and that said Letters Patent are hereby corrected as shown below:

In the Abstract of the Disclosure, line 9, change "of plurality" to --or plurality--.

Column 7, Claim 1, lines 15 and 19, delete "single".

Column 7, Claim 1, line 19, change "he" to --the--.

Column 7, Claim 2, line 24, change "along" to --across--.

Column 7, Claim 3, line 30, delete "single".

Column 8, Claim 6, line 12, delete "single".

Signed and sealed this 23rd day of July 1974.

(SEAL)
Attest:

McCOY M. GIBSON, JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.